(12) United States Patent
Warren et al.

(10) Patent No.: US 10,578,488 B1
(45) Date of Patent: Mar. 3, 2020

(54) COMPACT LIGHT DISPERSION SYSTEM

(71) Applicant: THE AEROSPACE CORPORATION, El Segundo, CA (US)

(72) Inventors: David Wheeler Warren, Los Angeles, CA (US); John A. Hackwell, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 16/151,999

(22) Filed: Oct. 4, 2018

(51) Int. Cl.
- *G01J 3/28* (2006.01)
- *G01J 3/02* (2006.01)
- *G01J 3/40* (2006.01)
- *G01J 3/45* (2006.01)

(52) U.S. Cl.
CPC ......... *G01J 3/2823* (2013.01); *G01J 3/0208* (2013.01); *G01J 3/40* (2013.01); *G01J 3/45* (2013.01); *G01J 2003/2826* (2013.01)

(58) Field of Classification Search
CPC .......... G01J 3/2823; G01J 3/40; G01J 3/0208; G01J 3/45; G01J 2003/2826; G01J 3/02; G01J 3/28; G01J 3/26; G02B 27/42; G02B 27/12
See application file for complete search history.

(56) References Cited

U.S. PATENT DOCUMENTS

| 2008/0158687 A1* | 7/2008 | Kamijima | G02B 5/045 359/640 |
| 2013/0176564 A1* | 7/2013 | Wang | G02B 27/1006 356/326 |

OTHER PUBLICATIONS

Longhurst, R. S., "The Constant Deviation Spectroscope", Geometrical and Physical Optics, 3rd edition, 1974, Section 5-17, p. 97.

* cited by examiner

*Primary Examiner* — Abdullahi Nur
(74) *Attorney, Agent, or Firm* — One LLP; Young Tang

(57) ABSTRACT

Disclosed herein are spectral imaging systems having an internally folded prism, which can have four different refracting surfaces. A first angle defines the spatial relationship between the first and second refracting surfaces. The first angle can have a range between 45-95 degrees. In some embodiments, the first angle can be 70 degrees. The spatial relationship of the third and fourth refracting surfaces can be defined by a second angle, which can be the same as the first angle. Finally, the spatial relationship of the second and third refracting surfaces can be defined by a third angle, which can have a range between 90-145 degrees. The prism index of refraction, the first, second, and third angles are selected such that TIR is achieved at two of the refracting surfaces. Additionally, these prism parameters are selected such that a 180 degrees fold of the optical path is achieved entirely within the prism.

19 Claims, 13 Drawing Sheets

COMPACT LIGHT DISPERSION SYSTEM

FIELD

Various aspects of the disclosure relate to spectral imaging, and in one aspect, but not by way of limitation, to hyperspectral imaging using a dispersive prism system.

BACKGROUND

Hyperspectral imaging is a spectral imaging technique frequently used in scientific and military applications. Hyperspectral imaging generates an intensity vs wavelength map of a target area that enables various analyses to be performed such as chemical detection and identification, mineral detection, color or paint signature identification, geologic feature identification, and crop health assessment. Hyperspectral imaging also has non-aerial applications such as hazardous materials detection, tissue scanning, anti-counterfeiting, waste detection, and quality control.

Hyperspectral imaging sensors may use tens to hundreds of contiguous spectral channels to resolve light with finer spectral resolution than is possible with multispectral sensors that only use a handful of discrete spectral bands. The finer spectral resolution enables hyperspectral sensors to detect and identify materials that often cannot be unambiguously identified with multispectral sensors. Hyperspectral imaging sensors, by design, have multitude of spectral bands that can produce well sampled spectral data resembling spectra acquired with laboratory spectrometers. To interpret the raw spectra data, a conversion process is typically performed to calibrate and transform the signal data to physical units of radiance, which is a measure of energy passing through the input aperture of the sensor at a given time as a function of the wavelength and sensor viewing angle. The hyperspectral imager may be thought of as a means for remotely acquiring spectral profiles of defined spatial areas on the object or field being observed.

Depending on the observed wavelengths, the radiance data can then be converted to reflectance data for reflective spectral analysis or to temperature and emissivity data for thermal spectral analysis. Each of these steps can include programmable compensation factors to account for atmospheric thermal emission, transmission, and scatter caused by various atmospheric constituents between the surveyed area and the hyperspectral imaging sensor.

For example, to obtain accurate reflectance spectra of the surveyed area from the raw spectral data, effects such as solar illumination, atmospheric scattering and absorption, etc., must be accounted for and removed from the raw reflectance spectra. Once atmospheric compensation has been performed, the generated reflective spectra can be compared with reflective spectra of known materials for identification.

SUMMARY

Disclosed herein are spectral imaging systems and dispersion prisms. The dispersion prisms comprise two refracting and two internally reflecting plane surfaces arranged symmetrically in pairs defining a solid volume of optical material (or forming a hollow polygonal cell filled with gas or liquid). The two refracting surfaces are interfaces between an external medium (air or vacuum) and the prism material and serve to symmetrically refract and disperse light entering and exiting the prism. The two reflecting surfaces reflect and fold the dispersing light inside the prism material. They do not affect the spectral dispersion but rather serve, by the appropriate choice of angle, to render the optical path into a more compact, stable, and easily aligned form.

Light encountering the first of the two refracting surfaces is dispersed in the course of being refracted because the different wavelengths refract differently depending on the refractive index of the prism material. Light exiting the prism at the second refracting surface is also refracted and dispersed in a symmetric fashion.

Between the first and second refracting surfaces, two reflective surfaces, also symmetric, fold the optical path. The angles of the reflecting surfaces are adjusted in conjunction with the angles of the refracting surfaces so as to cause the outgoing optical path to return parallel to the incoming path, but in the opposite direction, for a central design wavelength.

The material of a solid prism can have an index of refraction between 1.3 and 4.0 depending on the prism material. Depending on the amount of dispersion to be achieved, the incoming light can be introduced at varying angles of incidence on the first prism surface. For very low angles of incidence (e.g. below about 5 degrees) the dispersion is usually insufficient to be useful. For angles of incidence much above 35 degrees, the beam is affected by polarization and Fresnel reflection losses to a degree that can prove troublesome. Therefore, it is desirable to keep the range of incidence angles between 5 and 35 degrees on the first refracting surface.

The resulting incidence angles required at the reflective surfaces are always larger than 45 degrees and may range up to 60 degrees. For most prism materials, this angle is larger than the critical angle, where total internal reflection occurs at the boundary surface with nearly perfect efficiency.

Also disclosed is a dispersion system comprising: a dispersion prism, having one or more of the above described specifications; a slit; a collimator; a camera lens; and a sensor. The slit can be a single slit. Alternatively, the slit can have two or more parallel slits. The collimator is configured to collimate lights and to ensure that substantially all of the light rays entering the prisms are parallel. The camera lens can be an achromatic lens configured to focus the received light on the focal plane of the dispersion system. Depending on the aperture and field of view required, both collimator and camera lenses can be complex, multi-element designs in order to correct optical aberrations in the dispersed images.

The angles of the prism and the index of refraction are selected such that the prism will internally fold the optical path of the light entering the prism by 180 degrees at some central design wavelength. In other words, light at the center wavelength will exit the prism in an exactly opposite direction to the light entering the prism. The prism can be made of various types materials such as glass, crystal, gas, or liquid. The prism is symmetrical about the axis parallel to the entering and exiting light. In some embodiments, one or more surfaces of the prism can be coated with a reflective coating such as silver or aluminum.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

Figure 1:
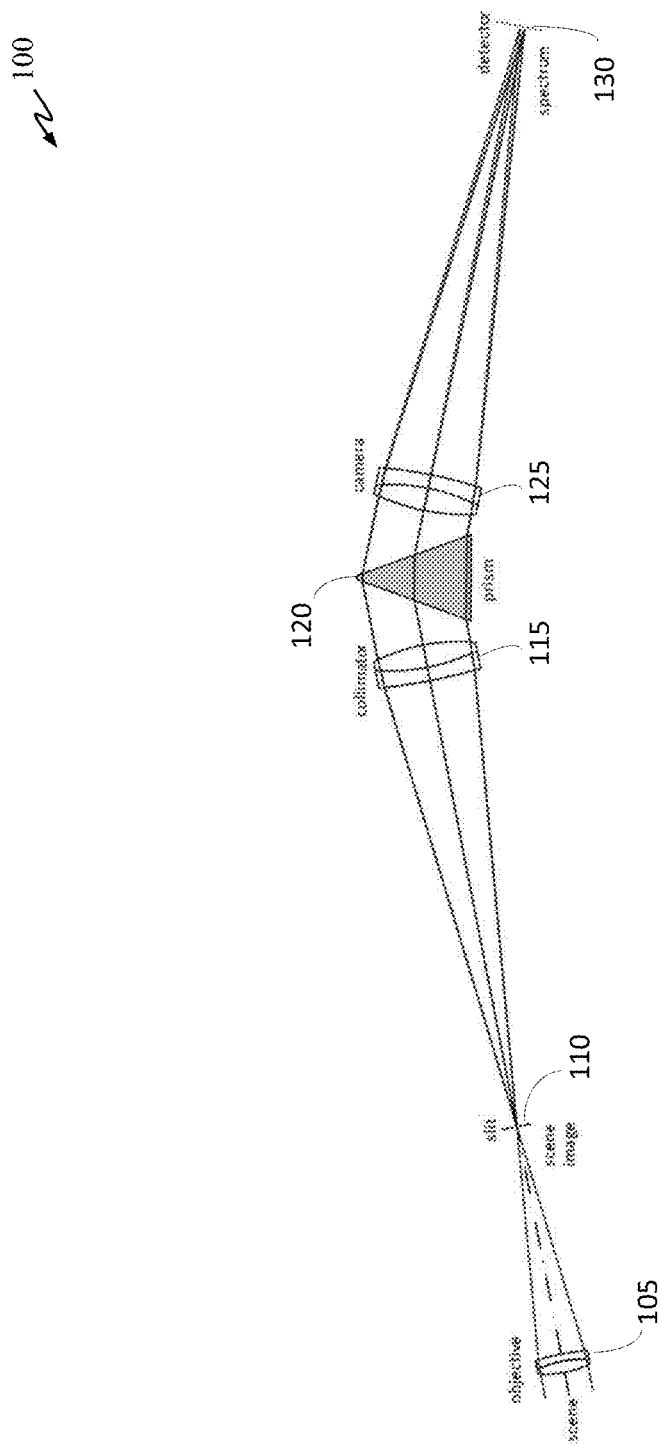
FIG. 1 illustrates a conventional prism spectrograph.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

Hyperspectral imaging spectrometers may be divided between two general types of spectrometers that fundamentally operate on different principles. The first type of spectrometer uses various interferometric or wavelength multiplexing techniques to record what is essentially the Fourier Transform of the object spectrum. During an observation, all wavelengths from a point in the object field are detected contemporaneously by a single detector element, with the amplitude at each wavelength being modulated by a cosine function of a unique periodicity over the observation time. The wavelength spectrum is then obtained from the observed interferogram via a Fourier Transform. In a conventional Fourier Transform Spectrometer (FTS), it can take a long time for the FTS to acquire the interferogram, which can be corrupted by changes in the signal from the object or any errors in the control of the interferometric system producing the modulations. Such errors are typically only a small fraction of the wavelength of the observed light. Transform spectrometers are consequently very difficult to implement from a moving observation platform such as an aircraft or satellite, where the aspect of the observed object may be changing more rapidly than the time needed to acquire the interferogram.

The second type of spectrometer uses a spectrally dispersive element to spread the different wavelengths from each sampled area of the object simultaneously over a number of spectral detector elements. With the advent of large detector arrays (e.g., two dimensional arrays of detectors), one dimension of the array (e.g. one of the rows) may be devoted to adjacent spatial elements of a defined scene. For example, one row of detectors can be dedicated to a certain scene using a slit in the image plane of an imaging system, while the other dimension (e.g. the columns) may be devoted to the spectra of each spatial element. One frame of data read from a two-dimensional detector array comprises simultaneous spectra of a line of spatial elements in the object field defined by the entrance slit of the spectrometer. Alternatively, each row of the frame represents an image of the slit at one particular wavelength determined by the amount of spectral dispersion. If the line of spatial elements is scanned over the object, for example, by the motion of the platform carrying the imaging sensor, successive frames read from the detector array form a three dimensional "image data cube" of every point in the two-dimensional scene, the third dimension being the spectral profile of each spatial element. This approach is often referred to as "pushbroom" imaging because of the way the line of spatial elements moves over the object. With modern detector arrays, it is now possible to capture and continuously record data with a thousand or more spectral samples over swaths with widths of a thousand or more spatial samples.

The optical elements most commonly used to spectrally disperse the light from each spatial element are either prisms or diffraction gratings. The first use of prisms for scientific observations is attributed to Newton, and predates the use of diffraction gratings by more than two hundred years. Diffraction gratings can deliver much larger spectral dispersions for a given size and have therefore largely supplanted prisms for the most demanding high-resolution instruments such as astronomical spectrographs on large telescopes. There are, however, applications in which the properties of prisms are uniquely beneficial, and hyperspectral imaging is one such application.

For surveying broad (greater than a factor of two in wavelength) spectral intervals at modest spectral dispersions, the transmission efficiencies of prisms are usually significantly higher than those of diffraction gratings, translating into higher throughput signals and more exploitable spectra. The higher transmission also results in lower stray light and better contrast in subtle features, as lost energy typically ends up as diffuse background inside the instrument. Finally, prisms do not exhibit multiple spectral orders as do gratings. In a prism instrument, a wavelength from a given spatial element is imaged to only one unique location on the detector array. Advantageously, a prism will form only a single, unambiguous spectrum from a given spatial element. One practical result is that multiple slits may be used to define multiple simultaneous spatial samples in the object field. As long as the spectral dispersions over the wavelength region of interest are adjusted so as not to overlap, the spatial coverage rate (proportional to the number of slits) may be traded against the spectral resolution (proportional to the number of spectral pixels allocated to each dispersed image of the slit). Such trade may prove advantageous in missions where area coverage is more important than fine spectral resolution.

A prism dispersive imaging spectrometer for hyperspectral imaging usually takes the form of an imaging system that collects the light from a scene, one or more slits in the image plane that defines the spatial location(s) being spectrally sampled, and a combination of a prism with mirrors or lenses that forms a dispersed image of the slit(s) on a two-dimensional array of detector elements. By employing non-planar (i.e. curved) surfaces, the prism may combine dispersive and reimaging functions in a single element. Alternatively, a prism with planar faces, and therefore no intrinsic focusing power, may be combined with focusing mirrors or lenses to form a dispersed spectral image.

For low resolution applications over large spectral intervals, a prism can be more desirable than a diffraction grating because of the absence of overlapping spectral orders. Additionally, a prism does not have false spectra or ghosts that could be present in a diffraction grating. The typical efficiency of a prism is also much greater than the efficiency of a diffraction grating. For example, as previously mentioned, over a range of 400-900 nm, the prism efficiency is approximately 90% at all wavelengths, while the diffraction grating efficiency is approximately 80% at the peak wavelength and falls below 50% at the ends (e.g. 400 and 900 nm) of the spectral band. Accordingly, for broad wavelength, high sensitivity, and moderate resolution applications such as hyperspectral imaging, a prism-based spectrograph is preferred. However, conventional prism spectrometers or spectrographs can have a long optical path. This makes them less desirable in satellite-based applications where space can be severely limited, particularly on small satellites.

FIG. 1 illustrates a conventional prism spectrograph 100 with a long optical path. Spectrograph 100 includes light collecting optics 105, a slit 110, a collimating lens 115, a prism 120, a camera lens 125, and a detector 130. A portion of the image formed by the light collecting optics is selected by slit 110, which controls the amount and direction of object light reaching collimating lens 115.

Collimating lens 115 ensures all rays of light reaching prism 120 are parallel to prevent overlapping dispersion of the light spectrum from rays of light with different wavelengths entering the prism at different angles.

Prism 120 disperses light entering from collimating lens 115 into its constituent colors. This occurs because each color has a different wavelength and reacts with the prism's refractive index differently. Generally, light with shorter wavelength will have a larger deviation, which is the change in the angle of travel as the light traverses through the prism. For example, the color violet (having a wavelength of approximately 400 nm) will have the largest deviation, and the color red (having a wavelength of approximately 700 nm) will have the smallest deviation. This phenomenon disperses white light into its constituent color and creates a rainbow. A camera or focusing lens 125 focuses the dispersed spectrum to a focal plane where sensor 130 resides. Without proper focus, the dispersed spectrum can overlap, which results in the loss of resolution or resolving power.

Figure 2:
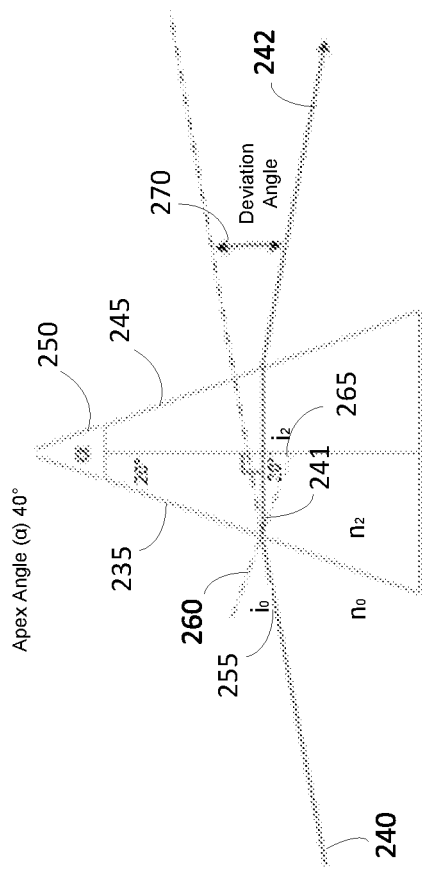
FIG. 2 illustrates the geometry of a conventional prism when used in the symmetric minimum deviation condition.

FIG. 2 illustrates the geometry of prism 200 used in the condition of minimum deviation. Prism 200 is defined by two plane faces 235 and 245 separated by an included angle α 250, the prism apex angle. Light ray 240 of a particular wavelength $\lambda_0$ is incident on first face 235 of prism 200 at an angle of incidence ($i_0$) 255 relative to the local normal 260 to the first surface 235 of prism 200. Incident ray 240 undergoes refraction at the prism face according to Snell's Law, and consequently enters prism 200 as a refracted ray 241 which is parallel to the base of prism 200 or, equivalently, perpendicular to the altitude of prism 200. Ray 241 then traverses prism 200 and exits the opposite face as ray 242 making another refraction according to Snell's Law. By symmetry, the incident and refracted angles of the second refraction are the same as the equivalent angles at the first refraction. The total deviation angle 270 of the ray is then $2(i_0-i_1)$, which can be proven mathematically that the deviation angle is a minimum under this condition compared to all other possible angles of incidence $i_0$. The condition of minimum deviation is advantageous because the symmetric geometry simplifies calculation of the angles and because there is no anamorphic magnification or scale change between the beams entering and exiting the prism.

From FIG. 2, it can also be seen that, from geometry, the refracted angle $i_1$ 265 of the ray at minimum deviation is equal to half the prism apex angle α 250. This constraint allows the angle of incidence $i_0$ 255 for minimum deviation at the wavelength $\lambda_0$ to be calculated from α 250 via Snell's Law: $i_0 = \sin^{-1}(n_1 \sin(\alpha/2))$, where $n_1$ is the refractive index of the prism material at wavelength $\lambda_0$.

If a prism spectrograph is to be designed to image a range of wavelengths $\lambda_{min}$–$\lambda_{max}$, then the wavelength $\lambda_0$ for minimum deviation geometry should be chosen so that the refractive index $n_1$ of the prism at $\lambda_0$ is exactly half way between the refractive indices at the extreme design wavelengths $\lambda_{max}$ and $\lambda_{min}$. In this way as the refractive index of the prism changes with wavelength, the ray paths at the other wavelengths are dispersed equally about the minimally deviated ray at $\lambda_0$.

For example, prism 200 can be made of SBSL7 optical glass that operates over the wavelength range 400-900 nm, $n_{400}$=1.530376 and $n_{900}$=1.508544. The refractive index half way between these two values is $n_0$=1.519460, which corresponds to a wavelength $\lambda_0$ of 523.9 nm. Note that because of the non-linear variation of refractive index with wavelength, $\lambda_0$ is not half way in nanometers between 400 and 900 nm, but closer to the shorter wavelength. For a prism with a 40 degree apex angle α, the angle of incidence for minimum deviation of the ray at 523.9 nm is $i_o$=31.311 degrees.

Figure 3:
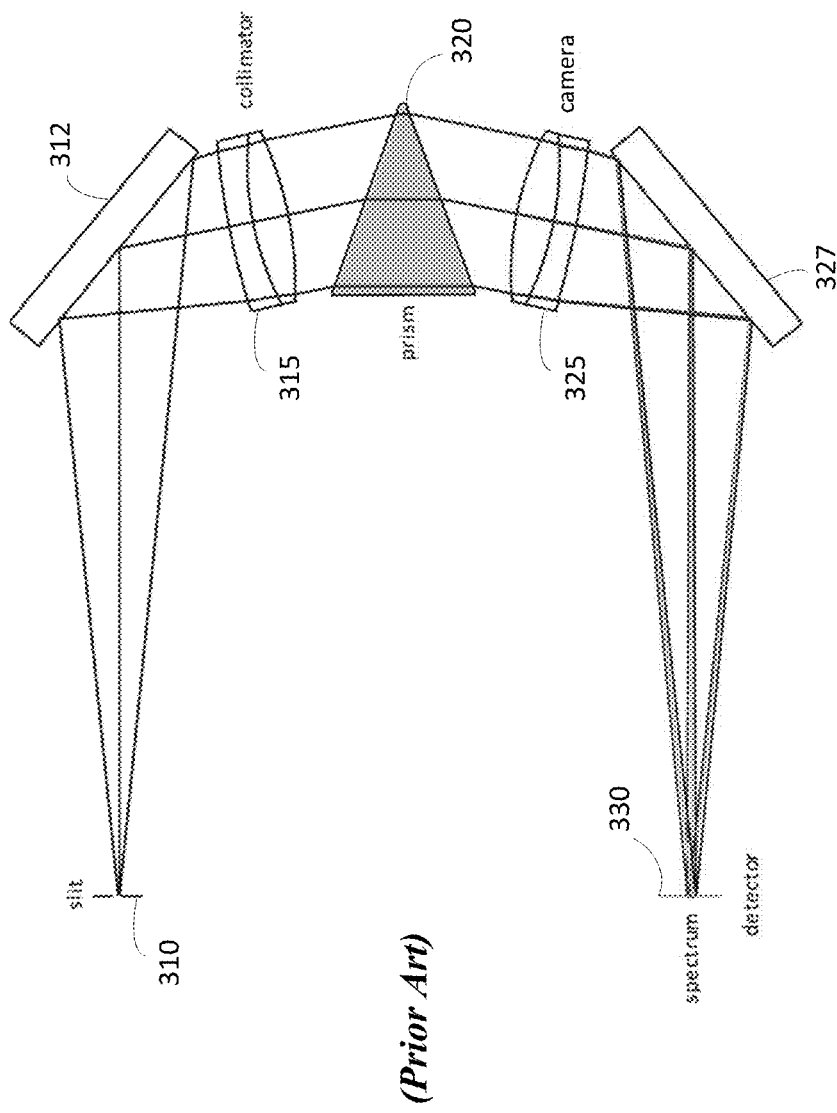
FIG. 3 illustrates a conventional folded prism spectrograph.

Even though spectrograph 100 has a long optical path, it can be an effective dispersion system for aerial surveying when using large platforms and/or where space is not an issue. However, when space is limited, a dispersion system with a smaller and more compact packaging is more desirable. One known technique for reducing the package size is to use an externally folded dispersion system. FIG. 3 illustrates how a conventional prism system may be folded in an effort to shorten the overall length of the system's packaging. The folded system 300 uses two reflecting mirrors to fold the optical path. System 300 uses a first reflecting mirror 312 to fold light from slit 310. This allows slit 310 to be positioned closer to prism 320 and thereby shortening the overall length of the system packaging. A second reflecting mirror 327 is used to reflect light from camera lens 325 to the focal plane or detector 330. This allows the overall length of the packaging of system 300 to be further reduced by moving the focal plane toward prism 320. This configuration, however, has more exposed elements that must be placed, aligned, and maintained at specific angles. This increases the risk misalignment over time as the system is being used. The exposed elements are also subject to contamination, increasing the possibility of scattered light in the system.

Internally Folded Dispersion Prism

Figure 4:
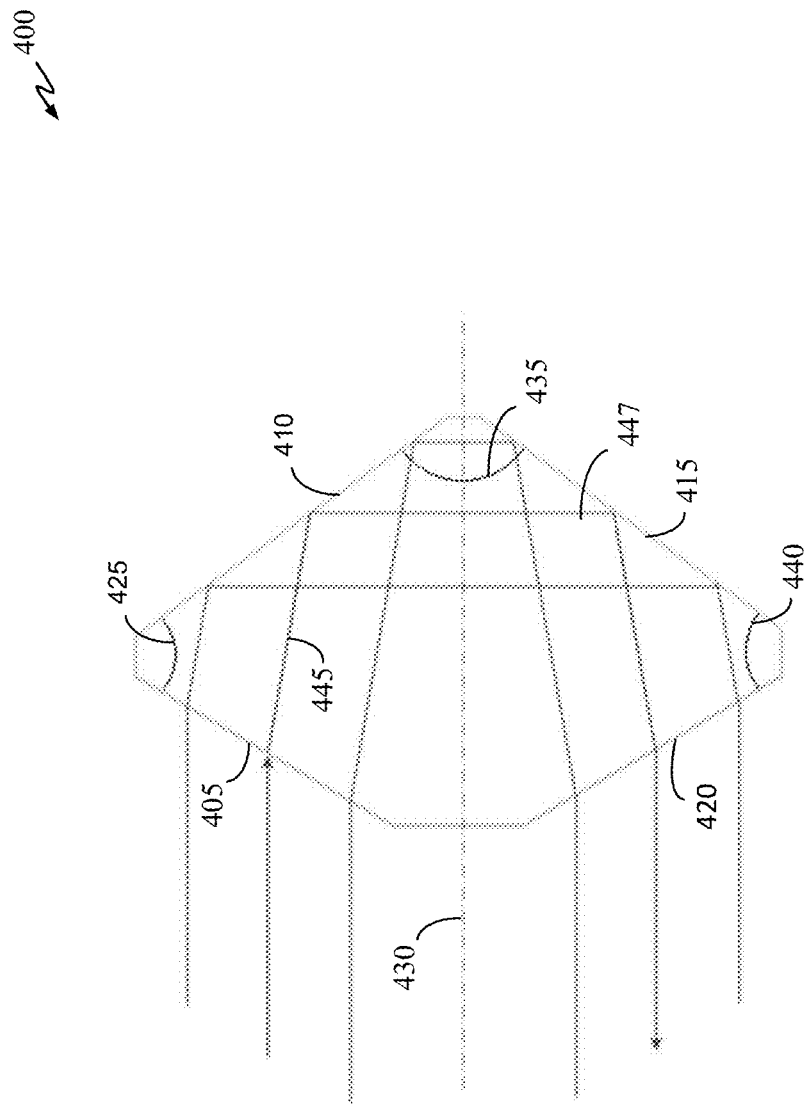
FIG. 4 illustrates a prism at minimum deviation with internal path(s) extended to provide for internal fold(s) in accordance with some embodiments of the disclosure.

FIG. 4 illustrates a dispersion prism 400 in accordance with some embodiments of the present disclosure. Dispersion prism 400 includes four refracting surfaces 405, 410, 415, and 420.

Refracting surface 405 receives light from a collimator (e.g., collimating lens 1154) and refracts (deflects) the light to refracting surface 410. The index of refraction of prism 400 and an angle 425 between reflecting surfaces 405 and 410 are selected such that a total internally reflection (TIR) is achieved at reflecting surface 410. TIR is a phenomenon where all of the light is totally internally reflected. TIR can occur when light is travelling from a material with a higher index of refraction to a material with a lower index of refraction and when the light's angle of incidence is greater than a certain angle referred to as the critical angle. When the light's angle of incidence is greater than the critical angle, the light is totally reflected at the refracting surface (e.g., refracting surface 410) surface and the surface behaves as if it were a reflecting surface.

In some embodiments, angle 425 can have a range between 30-90 degrees, depending on the index of refraction of prism 400 and/or the value of angle 435, which can be varied by design choices. Additionally, depending upon the value of angles 425 and 435, prism 400 can have an index of refraction between 1.3 and 4.0. In some embodiments, prism 400 can have an index of refraction of 1.462 and angles 425 and 435 are selected such that light entering refractive surface 405 is parallel to a symmetrical axis 430 of prism 400 and is entirely reflected at refractive surface 410, which means the angle of refraction is such that the refracted light will hit refractive surface 410 at greater than the critical angle.

Given an index of refraction of 1.462, the critical angle can be determined using Snell's law, which is defined as $n_0 \sin(\theta_0) = n_1 \sin(\theta_1)$. At the critical angle, the angle of refraction ($\emptyset_1$) is 90 degrees. In this case, Snell's law becomes $n_0 \sin(\theta_0) = n_1$. Additionally, given that the index of refraction of air is 1, the critical angle for prism 400 is 43.2 degrees. Thus, as long as the angle of incidence is greater than 43.2 degrees, the light ray will be totally reflected (via total internal reflection) at refracting surface 410. This is also true for refracting surface 415.

In some embodiments, angle 435 (i.e., angle between refracting surfaces 410 and 415) is first selected such that light hitting refractive surface 415 (from refracting surface 410) is entirely reflected and perpendicular to symmetrical axis 430. Next, angle 425 can be determined based on the material make up of prism 400. Prism 400 can be made with a solid material such as crown glass, flint glass, quartz, and the like. Alternatively, prism 400 can be hollow and filled with gas or liquid having a certain index of refraction. Once the prism material is selected and the index of refraction is determined, the angle of refracting surface 405 can be determined using geometry and Snell's law.

In some embodiments, angle 435 is selected to be 100 degrees. Using geometry, it can be determined that the angle of light ray 445 with respect to symmetrical (horizontal) line 430 is 10 degrees. This is because the angles of incidence and reflectance are both 50 degrees at refracting surface 410. This will result in a totally reflected light ray 447 being perpendicular to symmetrical line 430. To determine the angle of refracting surface 305 (or angle 425) of prism 400, the characteristics of a classical dispersion triangular prism can be examined (see FIG. 4).

It should be noted that different angles (e.g., angles 425 and 435) can be employed in combination with different values of the index of refraction that will achieve total internal reflection at refractive surfaces 410 and 415, and will also output light parallel to axis 430 and/or parallel with the incoming light at refractive surface 405.

In some embodiments, total internal reflection can be achieved at refractive surfaces 410 and 415 by applying a reflective coating (e.g., silver and evaporated aluminum) on the outer surfaces.

Figure 5:
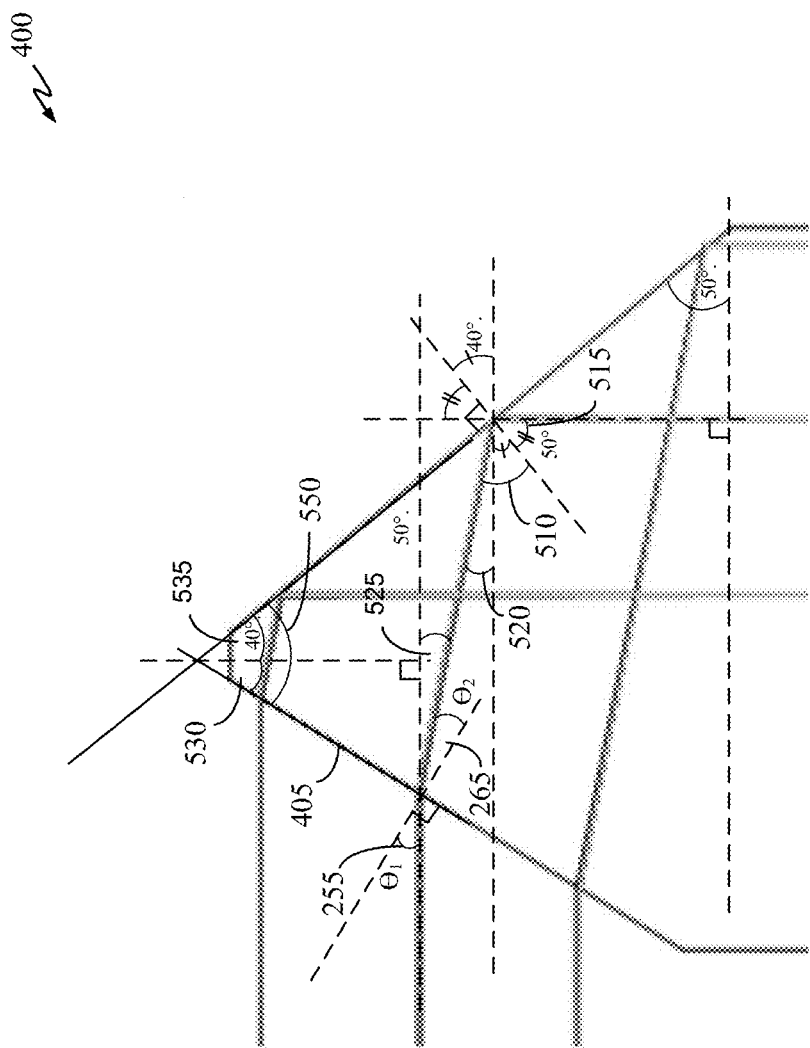
FIG. 5 is a close-up of the prism shown in FIG. 4.

FIG. 5 is a close up of the upper portion of prism 400. FIGS. 4 and 5 will be discussed concurrently. As shown, FIG. 5 illustrates various geometric identities. For example, the incident angle 255 (same angle illustrated in FIG. 2) can be determined from the various illustrated geometric relationships. For instance, given that angle 435 is 100 degrees (see FIG. 4), it can be determined the angle of incidence 510 and the angle of refraction 515 are also 50 degrees. Using the diagram shown in FIG. 5, which illustrate various geometric identities, it can be determined that angles 520 and 525 are 10 degrees. This means that the index of refraction and angle 550 should be selected such that light is refracted at 10° below the horizontal line or symmetrical axis 430 (see FIG. 4).

Next, the angle of incidence 255 ($\Theta 1$) at refracting surface 405 can be written as $\Theta 2 + 10°$. The angle of incidence 255 ($\Theta 1$) can then be rewritten, using Snell's law, as $\sin(\Theta_2 + 10°) * n_1 = \sin(\Theta_2) * n_2$. Given the following constant: $n_1 = 1$ and $n_2 = 1.462$, $\Theta_2$ can be solved using the above equation. In this embodiment, after solving for $\Theta_2$, $\Theta_2$ is equal to 20 degrees. This means $\Theta 1$ is equal to 30 degrees ($\Theta 2 + 10°$). Again, using geometry, it can be determined that angle 530 is also 30 degrees (equals to the angle of incidence 255), and angle 535 is equal to 40 degrees. This means angle 550 has a value of 70 degrees.

Prism 400 can be made of various materials such as crown glass, which can have an index of refraction between 1.52-1.62. Prism 400 can also be made with light, medium, or heavy flint glass, which has an index of refraction of 1.58, 1.63, and 1.89, respectively. For example, prism 400 can be made of a medium flint glass having an index of refraction of 1.630, and angle 335 can be 100°. In this example, the critical angle can be determined using the equation, $n_0 \sin(\theta_0) = n_1$. This yields a critical angle of 37.84 degrees. Since the angle of incidence 355 is still 50 degrees, and is greater than the critical angle, TIR will be achieved at refracting surfaces 310 and 315.

The angle of incidence (e.g., angle 255) and angle 530 (which is the angle of refracting surface 405 with respect to an axis perpendicular to symmetrical axis 430) can be quickly calculated using an approach that uses the equilateral triangle prism as a starting position. In this embodiment, incidence angle 255 can be determined to be 33.88 degrees. This also yields angle 530 to be 33.88 degrees. Because angles 255 and 530 are both 33.88 degrees, light entering at refracting surface 305 is parallel to symmetrical axis 330. Additionally, because light is entering refracting surface 305 at an angle not perpendicular to refracting surface 305, the light will be dispersed. Angles 325 and 335 of prism 400 can have a wide range of values that depends on the index of refraction of the prism material, which can also have a wide range of values.

It should be understood that various combinations of values of angles 425 and 435 and the index of refraction can be selected to achieve total internal reflection at refractive surfaces 410 and 415, and also to achieve a 180 degrees fold of the optical path (as measured from the incoming light ray to the exiting light ray). In some embodiments, angles 425, 435, and the index of refraction should be selected such that the incoming light ray at refracting surface 405 and the exiting light ray at refracting surface 420 are both parallel to symmetrical axis 430.

Figure 6:
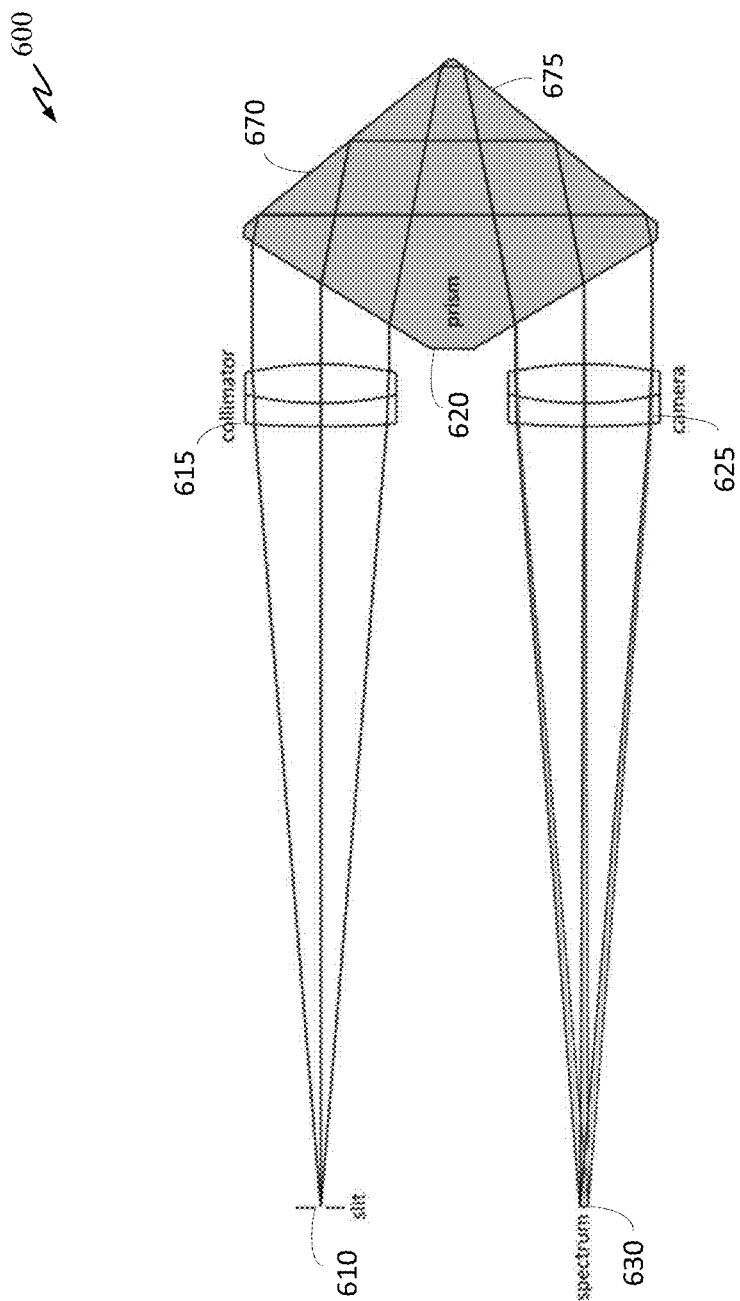
FIGS. 6 and 7 illustrate folded and dispersive optical systems in accordance with embodiments of the present invention.

FIG. 6 illustrates an internally folded optical system 600 with internal reflecting faces 670 and 675 in accordance with some embodiments of the present disclosure. In some embodiments, prism 620 of system 600 can be created when perturbation to the 45° Porro angle is made symmetrically to both reflecting faces 670 and 675. This process creates an internally folded optical path as shown in FIG. 6. System 600 also includes a slit 610, collimator 615, a camera lens 625, and a detector (e.g., CMOS optical sensor). In some embodiments, prism 620 has an index of refraction of 1.5147, an angle of incidence ($i_0$) of 31.2°, an angle of refraction ($i_1$) of 20°. In this embodiment, the perturbation to the 45° Porro angle is 5.6°, which can be represented as ½ ($i_0$–½ apex angle). Note that for many materials and geometries, the incidence angle at the internally reflecting prism faces is greater than the critical angle (the arcsin of 1 divided by the refractive index of the prism), and so the light undergoes total internal reflection at very high efficiency.

Figure 7:
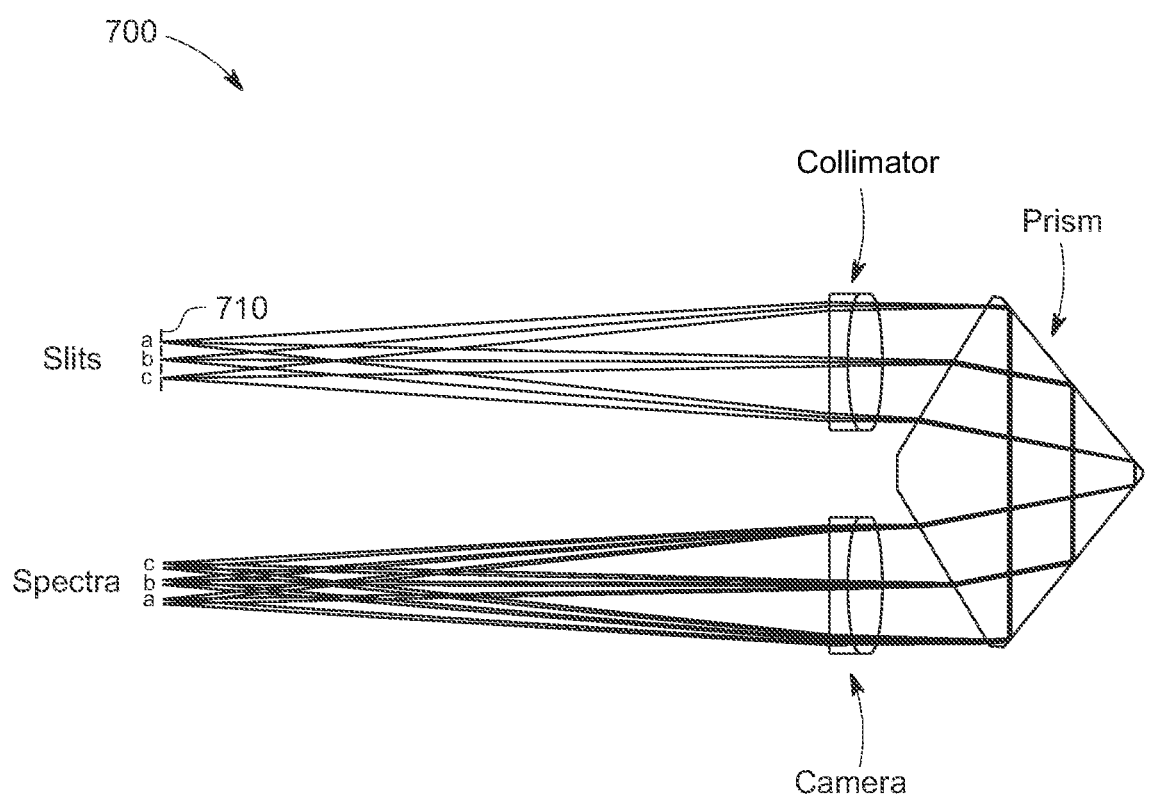

FIG. 7 illustrates an internally folded optical system 700 in accordance with some embodiments of the present invention. System 700 can include one or more features of system 600 as described above. However, instead of implementing a single slit to direct light to the collimator, system 700 uses a multi-slit 710. In some embodiments, slit 710 includes two or more parallel slits. Having more than one parallel slits can be advantageous in, for example, a pushbroom application (see FIG. 8) as multiple slits allow multiple sets of spectral data of a ground swath to be collected simultaneously. This enables a ground swatch to be analyzed multiple times in a single pass. Results from multiple analyses can be crossed checked with each other. In this way, the accuracy of the imaging spectrometer (with multiple slits) is greatly increased.

Figure 8:
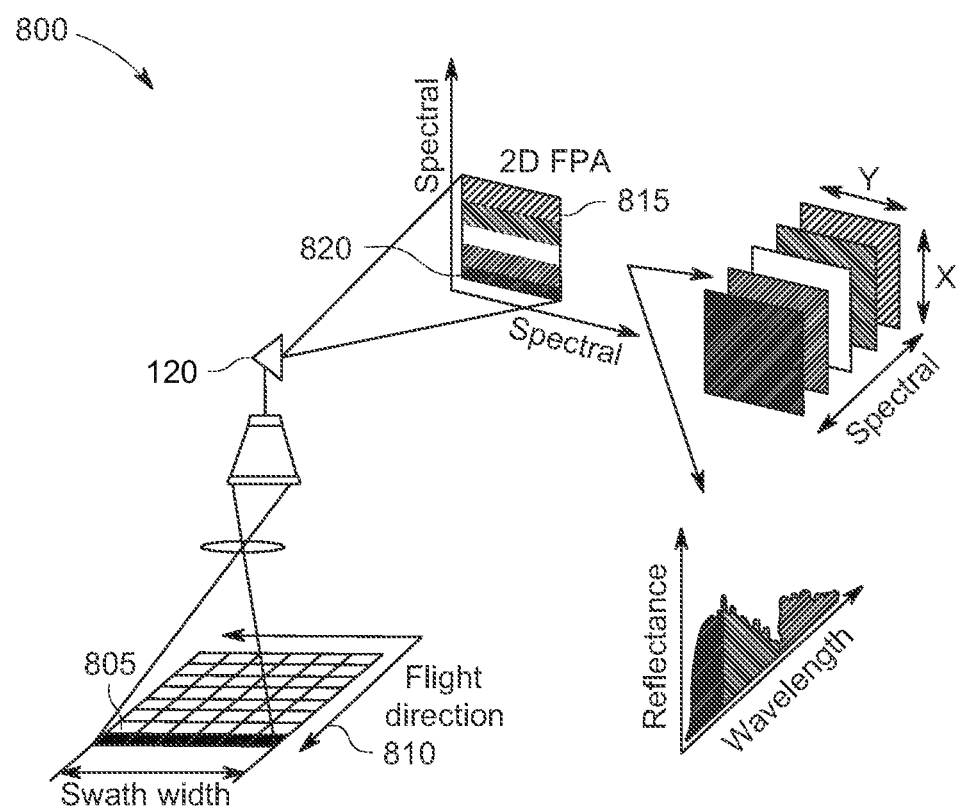
FIG. 8 illustrates a pushbroom spectrometer.

FIG. 8 illustrates an example of pushbroom spectrometer system 800. Conventional pushbroom systems use a single slit to filter and direct light to a collimating lens. The collimated rays of light are then dispersed by prism 115 onto focal plane 815, where a 2-dimensional sensor 820 is located. Sensor 820 can collect both the spectral and spatial data of light collected from ground swath 805. As imaging system 800 moves in the direction of flight (810), light from the next ground swath moves into position (field of the slit) and into system 800, and light from the current ground swatch moves out of position. With a single slit, subsequent ground swaths are analyzed in a first-in-first-out basis as each ground swatch moves in and out of the field of the slit. In other words, lights from each ground swath only enter spectrometer system 800 once through the single slit.

Referring again to FIG. 7, each slit can be arranged perpendicular to the direction of flight. In other words, each slit can be parallel to a ground swath being surveyed. Alternatively, each slit can be arranged in other directions with respect to the direction of flight. With multiple slits, light from a ground swatch can move out of position of one slit and into position of another slit as system 700 moves in the direction of flight. This allows spectral and spatial data of the ground swath to be captured and analyzed multiple times as a ground swath moves from one end of the field of view to the other end of the field of view of system 700. Stated differently, during the transit of a ground swath from one end of the field of view to the other, light from the ground swath will enter multiple slits, which enables system 700 to collect spectral and spatial data of the ground swath at various points during the transit. In this way, multiple sets of spectral and spatial data can be obtained and thereby increase the accuracy of the ground swath analysis.

Figure 9:
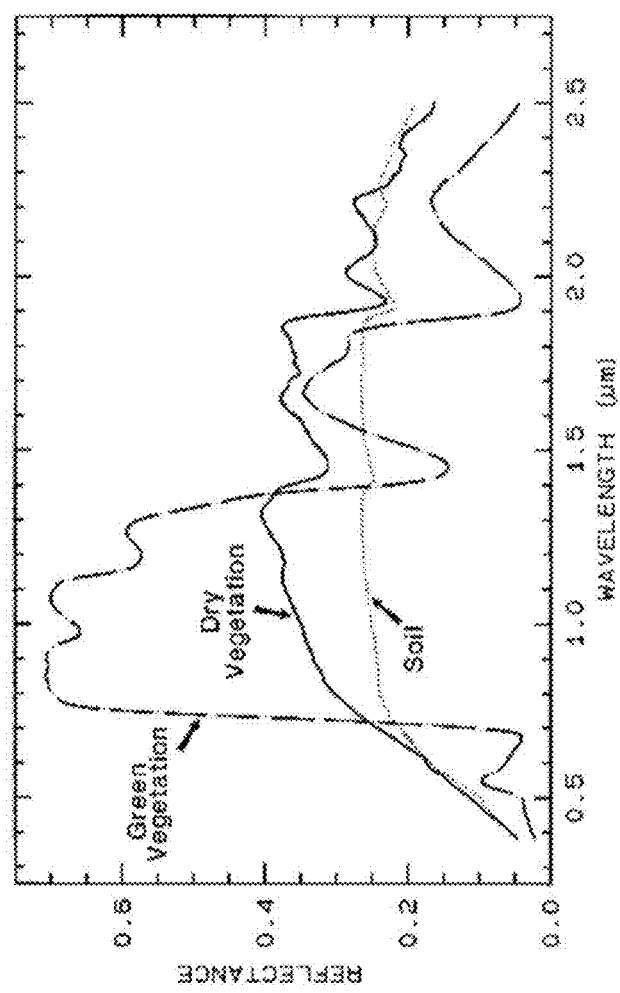
FIG. 9 illustrates a reflectance spectrograph.

For example, multiple reflectance spectra can be generated using the multiple sets of spectrum data collected using the multiple slits system. This way, an average spectral reflectance pattern or signature can be generated and compared with the reflectance spectra of known materials. FIG. 9 illustrates an example of the spectral reflectance signatures of green vegetation, dry vegetation, and soil. The green vegetation reflectance signature, for example, has very low reflectance in the visible band of the electromagnetic spectrum, which is between 390-700 nm (or 0.39 to 0.7 µm). Another noticeable feature of the green vegetation reflectance signature is the significantly high reflectance between the 750 to 1300 nm, and a mid-level reflectance peak 1650 to 1900 nm. In some embodiments, system 700 an determine an average reflectance signature of multiple reflectance spectra generated using lights from multiple slits 710. By using an average reflectance signature, the accuracy of system 700 can be enhanced.

Figure 10:
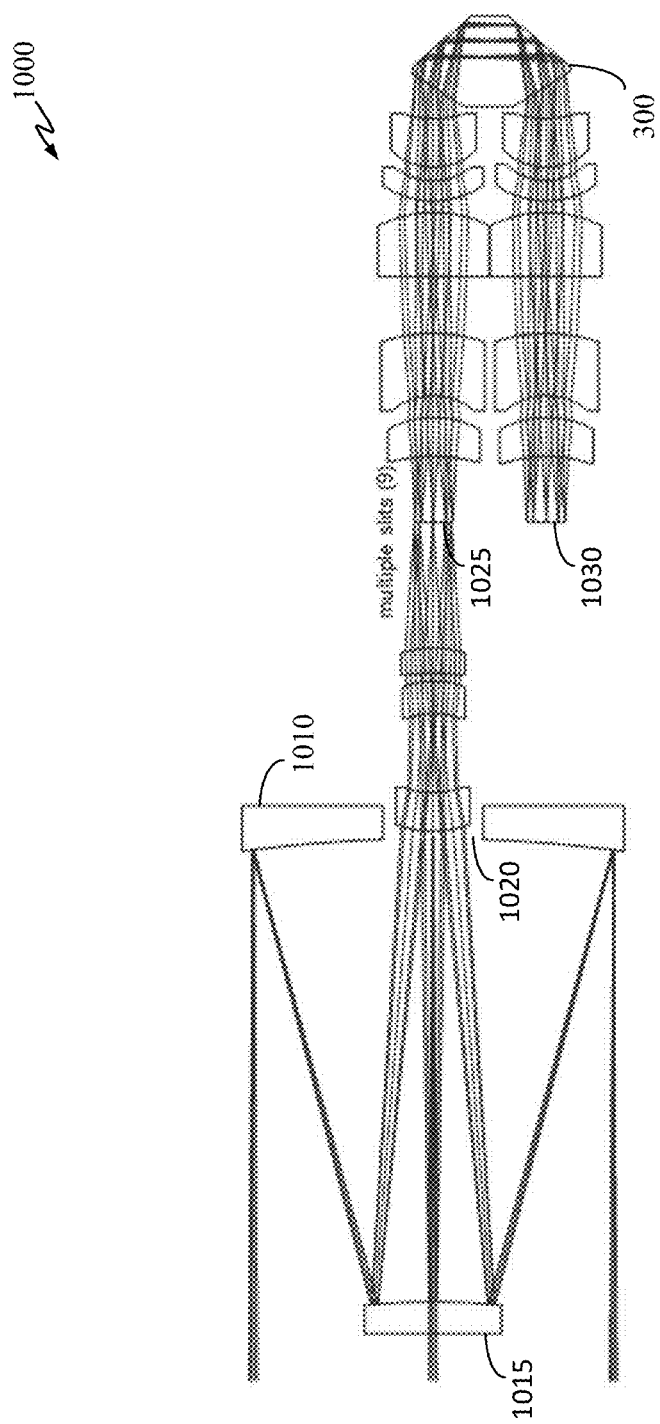
FIG. 10 illustrates spectrograph with multiple slits in accordance with some aspects of the present disclosure.
Figure 11:
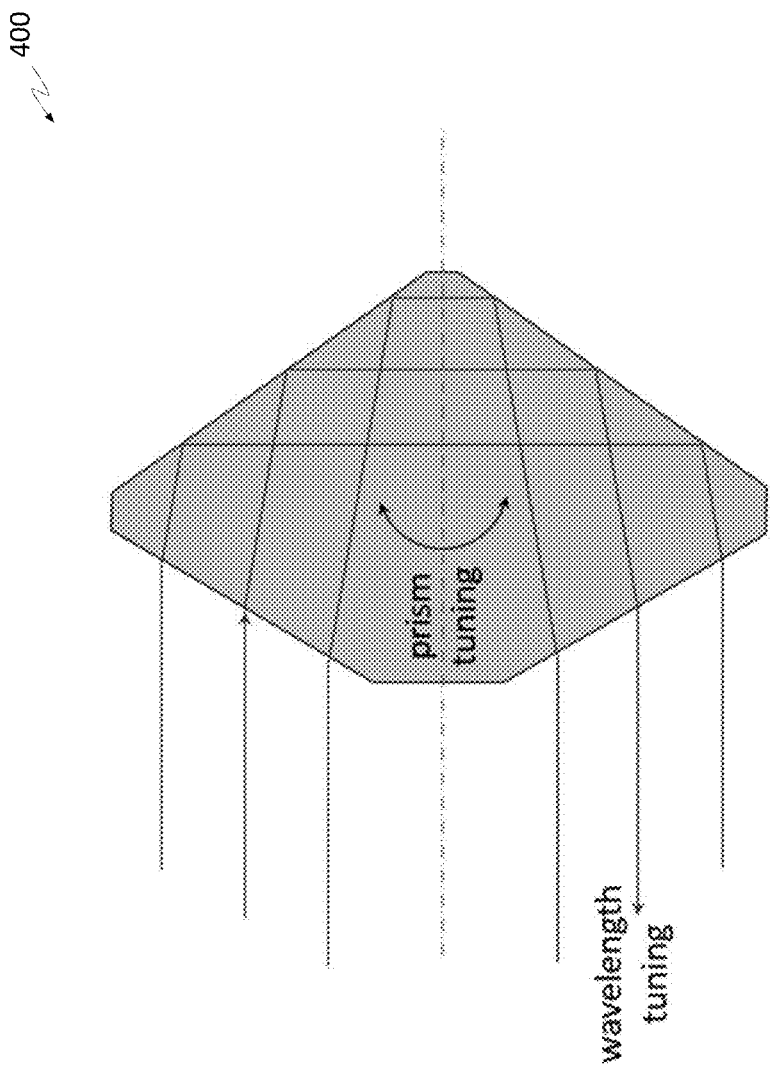
FIG. 11 illustrates an example of a tuning prism in accordance with some embodiments of the present disclosure.

FIG. 10 illustrates an imaging system 1000 in accordance with some embodiments of the present disclosure. System 1000 can be a hyperspectral or multispectral imaging system that uses an internally 180 degrees fold prism 400. System 1000 can be a reflector telescope with a primary mirror 1010 and a secondary mirror 1015, which reflect light collected by primary mirror 1010 to a hole 1020 in the center of primary mirror 1010. System 1000 can have a series of collimating and/or camera lens to guide the light to and out of prism 400. As illustrated, system 1000 can include a plurality of slits 1025. In this embodiment, multiple reflectance spectra can be generated by prism 400 and recorded by focal plane array (FPA) 1030, which is located at the focal plane of system 1000.

Wavelength Tuning

Figure 12:
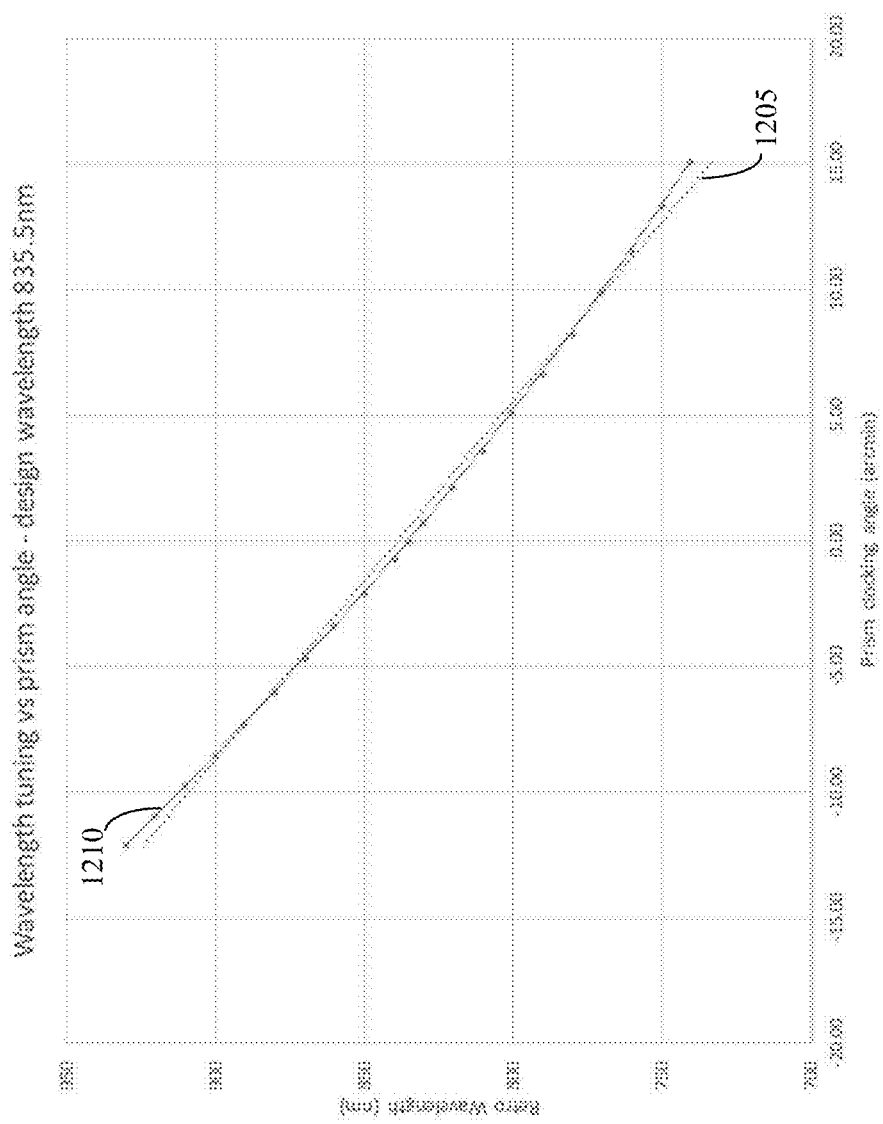
FIG. 12 illustrates a calibration curve of a tuning prism in accordance with some embodiments of the present disclosure.

In some embodiments, prism 400 can be used in a tuning system for tuning a laser to operate within a specific wavelength. This can be done by fixing prism 400 in place while using a reflecting mirror to select a particular wavelength refracted by prism 400. Tuning is accomplished if the desired/selected wavelength of the laser resonates within the laser cavity. In some embodiments, instead of using a reflecting mirror for wavelength selection, prism 400 can be rotated (e.g., clocked) to select the desired wavelength. FIG. 12 illustrates the relationship between a laser's wavelength and the clocking angle of the prism. Dotted line 1205 is the calibration curve, which has a linear wavelength to prism angle relationship. Solid line 1210 is the actual measurement curve of the laser being calibrated to match the calibration curve.

Reflector Array

Figure 13B:
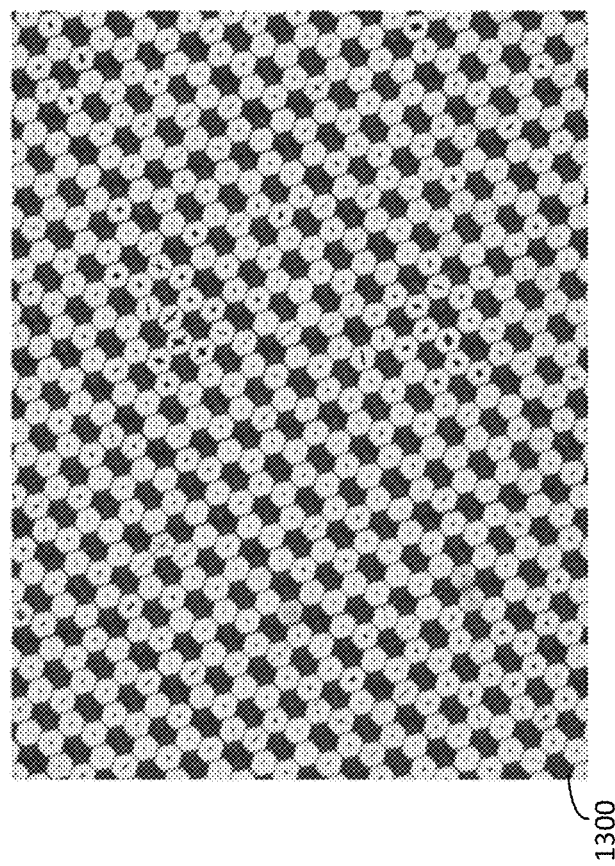
FIG. 13B is a top view of a micro-prism array in accordance with some aspects of the present disclosure.
Figure 13A:
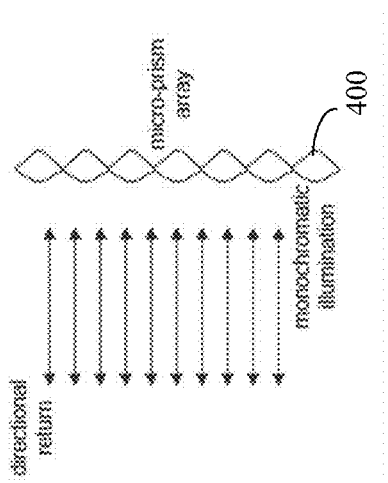
FIG. 13A is a side view of a micro-prism array in accordance with some aspects of the present disclosure.

Retro-reflector arrays have many useful applications. Notably, retro-reflector arrays can be used in road signs and posts to capture drivers' attention. Convention retro-reflector arrays use an array of Porro-prisms, which are non-dispersion prisms. Porro-prisms are basically right-triangle prisms positioned such that lights would enter and exit the base of the prisms. However, conventional retro-reflector arrays are non-dispersing and cannot reflect light back a certain spectrum. FIGS. 13A-B are side and top views of a retro-reflector array 1300, respectively, in accordance with some embodiments of the present disclosure. Retro-reflector array 1300 can consist of an array of prisms 400, which are designed to reflect light back at the source but in a certain portion of the light spectrum. In some embodiments, array 1300 can reflect back a particular portion of the spectrum such as red or yellow. In other words, rather than seeing the same color shined at array 1300 reflecting back to the source, an observer can see a different color of the light dispersed spectrum being reflected back. For example, given a halogen light source, the index of refraction of array 1300 can be selected such that the red portion of the spectrum is reflect back more powerful than other portions of the spectrum. In this way, road signs can visibly and clearly stand out against a well-lit background, for example. In another example, the index of refraction of array 1300 can be selected such that the blue portion of the spectrum is reflected back more powerful than other portions of the spectrum.

In some embodiments, array 1300 can be manufactured using a 3-D printing process, a molding process, or a 3D stereolithographic printing process. Each prism of array 1300 can have similar or identical features as prism 400 as described above with respect to FIG. 4.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof.

Where a discrete value or range of values is set forth, it is noted that that value or range of values may be claimed more broadly than as a discrete number or range of numbers, unless indicated otherwise. For example, each value or range of values provided herein may be claimed as an approximation and this paragraph serves as antecedent basis and written support for the introduction of claims, at any time, that recite each such value or range of values as "approximately" that value, "approximately" that range of values, "about" that value, and/or "about" that range of values. Conversely, if a value or range of values is stated as an approximation or generalization, e.g., approximately X or about X, then that value or range of values can be claimed discretely without using such a broadening term. Those of skill in the art will readily understand the scope of those terms of approximation. Alternatively, each value set forth herein may be claimed as that value plus or minus 5%, and each lower limit of a range of values provided herein may be claimed as the lower limit of that range minus 5%, and each upper limit of a range of values provided herein may be claimed as the upper limit of that range plus 5%, and this paragraph serves as antecedent basis and written support for the introduction of claims, at any time, that recite those percentile variations.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In many instances entities are described herein as being coupled to other entities. It should be understood that the terms "coupled" and "connected" (or any of their forms) are used interchangeably herein and, in both cases, are generic to the direct coupling of two entities (without any non-negligible intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

Additionally, as used herein and in the appended claims, the singular forms "a," "an," and "the" include plural referents unless the context clearly dictates otherwise.

The invention claimed is:

1. A dispersion system comprising:
   a prism comprises:
      a first and a second refracting surface, wherein a first angle between the first and second refracting surfaces is between 45-95 degrees;
      a third and a fourth refracting surface, wherein a second angle between the third and fourth refracting surfaces is equal to the first angle, and wherein a third angle between the second and third refracting surfaces is between 90-145 degrees; and
      an index of refraction, wherein the index of refraction, the first angle and the third angle are selected such that total internal refraction is achieved at both the second and third refracting surfaces.

2. The dispersion system of claim 1, wherein the first and third angles are 40 and 100 degrees, respectively, and the index of refraction is 1.462.

3. The dispersion system of claim 1, wherein the second and third refracting surfaces are coated with a reflective coating, and wherein the wherein the index of refraction, the first angle and the third angle are selected such that total internal refraction is achieved at both the second and third refracting surfaces.

4. The dispersion system of claim 1, further comprises a collimator lens to collimate lights from a light source and to direct the collimated lights to the first refracting surface.

5. The dispersion system of claim 4, wherein the light source comprises a slit.

6. The dispersion system of claim 4, wherein the light source comprises multiple slits.

7. The dispersion system of claim 1, wherein the second refracting surface is configured to internally refract light to the third refracting surface, and the third refracting surface is configured to internally refract light to the fourth refracting surface.

8. The dispersion system of claim 1, further comprises an achromatic lens to receive light from the fourth refracting surface and to focus the received light on a focal plane of the dispersion system.

9. The dispersion system of claim 1, wherein the prism is configured to internally fold an optical path of the light entering the prism by 180 degrees.

10. The dispersion system of claim 1, wherein the prism comprises a visible near-infrared prism.

11. A spectrograph comprising:
   a dispersion prism having a first, a second, a third, and a fourth refractive surfaces, wherein a first angle between the first and the second refractive surfaces is equal to a second angle between the third and fourth refractive surfaces, the first and second angles being between 35-45 degrees, and wherein a third angle between the second and third refractive surfaces is between 90-145 degrees;
   a collimator;
   a slit structure configured to pass light to the collimator, wherein the collimator is configured to direct collimated light to the dispersion prism;

a sensor; and a lens configured to focus light received from the dispersion prism to the sensor, wherein the sensor and the slit structure are located on a same side of the dispersion prism without using a reflecting mirror.

12. The spectrograph of claim 11, wherein the third and fourth refractive surfaces are coated with a reflective coating.

13. The spectrograph of claim 11, wherein the first and third angles are 40 and 100 degrees, respectively.

14. The spectrograph of claim 13, wherein the dispersion prism has a refractive index of 1.462.

15. The spectrograph of claim 11, wherein the slit structure comprises a single slit.

16. The spectrograph of claim 11, wherein the slit structure comprises two or more slits.

17. The spectrograph of claim 11, wherein collimated light entering the first refracting surface is parallel to light exiting the fourth refracting surface.

18. The spectrograph of claim 11, wherein the dispersion prism is configured to fold an optical path of the light entering the prism by 180 degrees.

19. The spectrograph of claim 11, wherein the dispersion prism is configured to internally fold an optical path of the light entering the prism by 180 degrees.

\* \* \* \* \*